(12) United States Patent
Becker et al.

(10) Patent No.: US 10,719,947 B2
(45) Date of Patent: Jul. 21, 2020

(54) THREE-DIMENSIONAL MEASUREMENT DEVICE WITH ANNOTATION FEATURES

(71) Applicant: FARO Technologies, Inc., Lake Mary, FL (US)

(72) Inventors: Reinhard Becker, Stuttgart (DE); Martin Ossig, Tamm (DE); Joseph A. Arezone, Cleveland Heights, OH (US); Gerrit Hillebrand, Waiblingen (DE); Rene Pfeiffer, Muehlacker (DE); Daniel Döring, Ditzingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 191 days.

(21) Appl. No.: 15/959,640

(22) Filed: Apr. 23, 2018

(65) Prior Publication Data

US 2018/0336690 A1 Nov. 22, 2018

Related U.S. Application Data

(60) Provisional application No. 62/508,439, filed on May 19, 2017.

(51) Int. Cl.
*G06T 7/521* (2017.01)
*G01B 11/00* (2006.01)
(Continued)

(52) U.S. Cl.
CPC ............ *G06T 7/521* (2017.01); *B25J 9/161* (2013.01); *B25J 15/0408* (2013.01); *G01B 11/002* (2013.01); *G01B 11/14* (2013.01); *G01B 11/24* (2013.01); *G01B 21/042* (2013.01); *G01C 11/06* (2013.01); *G01S 3/8034* (2013.01); *G01S 7/481* (2013.01); *G01S 17/08* (2013.01); *G01S 17/66* (2013.01); *G01S 17/89* (2013.01);
(Continued)

(58) Field of Classification Search
CPC ... G01B 11/002; H04N 13/239; H04N 13/243
See application file for complete search history.

(56) References Cited

U.S. PATENT DOCUMENTS 9,196,067 B1 * 11/2015 Freed ...................... G06T 11/60
9,602,811 B2 3/2017 Hillebrand et al.
(Continued)

OTHER PUBLICATIONS

Extended European Search Report for Application No. 18173131.6 dated Oct. 26, 2018; 8 pgs.

*Primary Examiner* — Ross Varndell
(74) *Attorney, Agent, or Firm* — Cantor Colburn LLP (57) ABSTRACT

A three-dimensional (3D) measurement system and method is provided. The system includes a noncontact measurement device, an annotation member and a processor. The noncontact measurement device being operable to measure a distance from the noncontact measurement device to a surface. The annotation member is coupled to the noncontact measurement device. The processor is operably coupled to the noncontact measurement device and the annotation member, the processor operable to execute computer instructions when executed on the processor for determining 3D coordinates of at least one point in a field of view based at least in part on the distance, recording an annotation in response to an input from a user, and associating the annotation with the at least one point.

22 Claims, 7 Drawing Sheets

(51) Int. Cl.
*G01B 11/14* (2006.01)
*H04N 13/243* (2018.01)
*H04N 13/254* (2018.01)
*H04N 13/183* (2018.01)
*G06T 7/593* (2017.01)
*G01S 3/803* (2006.01)
*G01C 11/06* (2006.01)
*B25J 15/04* (2006.01)
*G01S 17/66* (2006.01)
*G01S 17/08* (2006.01)
*G01S 7/481* (2006.01)
*G01B 11/24* (2006.01)
*G06K 7/10* (2006.01)
*G01B 21/04* (2006.01)
*B25J 9/16* (2006.01)
*G01S 17/89* (2020.01)
*H04N 5/232* (2006.01)

(52) U.S. Cl.
CPC .......... *G06K 7/10297* (2013.01); *G06T 7/593* (2017.01); *H04N 5/232* (2013.01); *H04N 13/183* (2018.05); *H04N 13/243* (2018.05); *H04N 13/254* (2018.05)

(56) References Cited

U.S. PATENT DOCUMENTS

| | | |
|---|---|---|
| 9,671,221 B2 | 6/2017 | Ruhland et al. |
| 9,693,040 B2 | 6/2017 | Hillebrand et al. |
| 9,769,463 B2 | 9/2017 | Hillebrand et al. |
| 9,915,521 B2 | 3/2018 | Hillebrand et al. |
| 2012/0223885 A1 | 9/2012 | Perez |
| 2015/0075018 A1* | 3/2015 | Bridges .................. G01B 5/008 33/503 |
| 2016/0073085 A1 | 3/2016 | Hillebrand et al. |
| 2016/0073091 A1 | 3/2016 | Hillebrand et al. |
| 2016/0129594 A1 | 5/2016 | Telling |
| 2017/0188015 A1 | 6/2017 | Heidemann et al. |
| 2018/0063510 A1 | 5/2018 | Becker |

* cited by examiner

THREE-DIMENSIONAL MEASUREMENT DEVICE WITH ANNOTATION FEATURES

CROSS REFERENCE TO RELATED APPLICATIONS

This application claims the benefit of U.S. Provisional Application Ser. No. 62/508,439, filed May 19, 2017, the entire disclosure of which is incorporated herein by reference.

BACKGROUND

The subject matter disclosed herein relates to a three-dimensional (3D) measurement device, and in particular to a 3D measurement device operable to receive and store date to annotate the 3D measurements.

A 3D imager is a portable device includes a projector that projects light patterns on the surface of an object to be scanned. Typically the projector emits a coded or uncoded pattern. One (or more) cameras, having a predetermined positions and alignment relative to the projector, which record images of the light pattern on the surface of an object. The three-dimensional coordinates of elements in the light pattern can be determined by trigonometric methods, such as by using epipolar geometry. Other types of noncontact devices may also be used to measure 3D coordinates, such as those that use time of flight techniques (e.g. laser trackers, laser scanners or time of flight cameras) for measuring the amount of time it takes for light to travel to the surface and return to the device.

Often, the operator may want to make additional notes about observations or include other data. These observations, such as noises that are heard for example, may be recorded with handwritten notes. These handwritten notes may be later incorporated into a report. However, the association about where the operator was at the time the notes were made will be lost or only have a tenuous relationship with the 3D data if the operator remembers to precisely describe where they are when the notes are written.

Other types of annotations may include measurements between user identified points in the environment being scanned. Similarly, an operator may make manual measurements (e.g. with a tape measure) and make a handwritten note of the distance. However, as with the observation notes, these measurements are ancillary to and separate from the 3D coordinate data.

Accordingly, while existing 3D imagers are suitable for their intended purpose the need for improvement remains, particularly in providing a system for associating annotation data with the measured 3D coordinates.

BRIEF DESCRIPTION

According to one aspect of the disclosure, a three-dimensional (3D) measurement system is provided. The system includes a noncontact measurement device, an annotation member and a processor. The noncontact measurement device being operable to measure a distance from the noncontact measurement device to a surface. The annotation member is coupled to the noncontact measurement device. The processor is operably coupled to the noncontact measurement device and the annotation member, the processor operable to execute computer instructions when executed on the processor for determining 3D coordinates of at least one point in a field of view based at least in part on the distance, recording an annotation in response to an input from a user, and associating the annotation with the at least one point.

According to another aspect of the disclosure, a method for acquiring 3D coordinates with additional data is provided. The method includes acquiring point data about a plurality of points on a surface with a noncontact measurement device. 3D coordinates of the plurality of points are determined based at least in part on the point data. In a first instance, annotation data is recorded with an annotation member in response to an input from a user, the annotation member being coupled to the noncontact measurement device. The annotation data is associated with at least a portion of the 3D coordinates of points, wherein the portion of the 3D coordinates of points were determined from the point data acquired contemporaneously with the annotation data.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the invention provide for a three-dimensional (3D) measurement device that acquires annotation data that is registered with the coordinate data. Embodiments of the invention provide for the recording of sounds, such as the operators voice or background noise. Still further embodiments provide for the emitting of a visible light beam that can be used for marking locations in the environment that are being scanned, or for measuring distances between two marked points.

Figure 1:
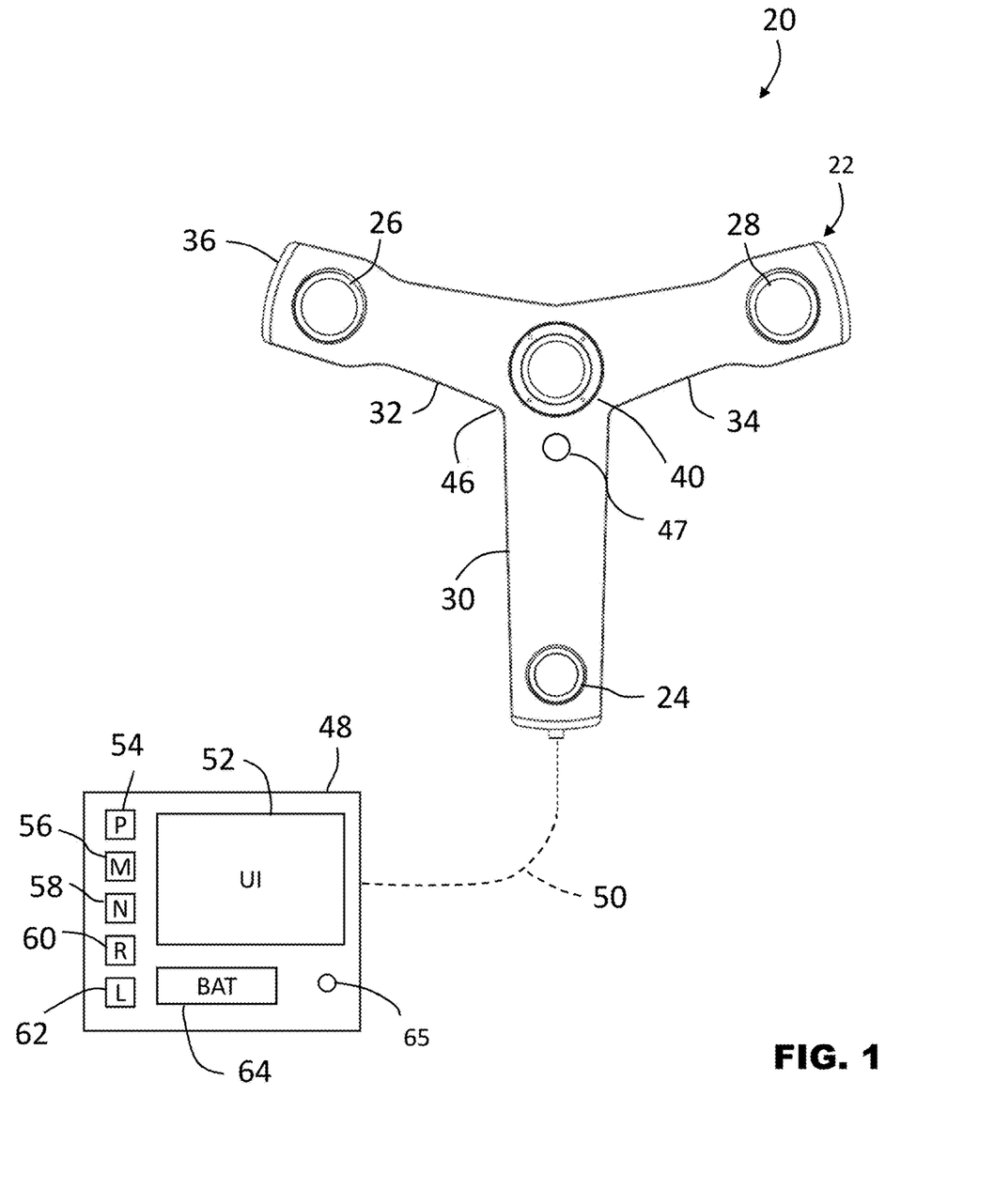
FIG. 1 is a view of a 3D imager system in accordance with an embodiment of the invention.

Referring now to FIG. 1, a measurement device, such as 3D imager system 20, is shown for determining 3D coordinates of surfaces in an environment. The system 20 includes an image scanner 22 having a projector 24, a first camera 26 and a second camera 28. In the exemplary embodiment, the projector 24, and cameras 26, 28 are each disposed in a separate arms 30, 32, 34 of a housing 36 respectively. A color camera 40 may be centrally disposed on the housing 36 between the arms 30, 32, 34. In the exemplary embodiment, the color camera 40 has a field of view that acquires images, including color information, of the environment being scanned. In an embodiment, the color camera 40 may be used to provide color (texture) information for incorporation into the 3D image. In some embodiments, the camera 40 acquires a video image may be used to register multiple 3D images through the use of videogrammetry. The color camera 40 is sometimes referred to as an RGB camera. In an embodiment discussed below, the image scanner 22 may further have an annotation device 47, such as a microphone or a laser light source that emits a visible beam of light. In an embodiment, the laser light source may include an assembly, such as a digital micromirror device (DMD) or galvomirrors for example, that allows the visible beam of light to be moved relative to the image scanner 22.

As discussed in more detail herein, in an embodiment the projector 24 projects a pattern of light onto a surfaces in the environment. As used herein, the term "projector" is defined to generally refer to a device for producing a pattern. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

The cameras 26, 28 acquire images of the pattern and in some instances able to determine the 3D coordinates of points on the surface using trigonometric principles, e.g. epipolar geometry.

It should be appreciated that while the illustrated embodiments show and describe the device that determines 3D coordinates as being an image scanner, this is for exemplary purposes and the claimed invention should not be so limited. In other embodiments, devices that use other noncontact means for measuring 3D coordinates may also be used, such as a laser scanner device that uses time-of-flight to determine the distance to the surface.

A controller 48 is coupled for communication to the projector 24, cameras 26, 28, 40 and in an embodiment the annotation device 47. The connection may be a wired-connection/data-transmission-media 50 or a wireless connection. The controller 48 is a suitable electronic device capable of accepting data and instructions, executing the instructions to process the data, and presenting the results. Controller 48 may accept instructions through user interface 52, or through other means such as but not limited to electronic data card, voice activation means, manually-operable selection and control means, radiated wavelength and electronic or electrical transfer.

Controller 48 uses signals act as input to various processes for controlling the system 20. The digital signals represent one or more system 20 data including but not limited to images acquired by cameras 26, 28, 40, temperature, ambient light levels, operator inputs via user interface 52 and the like.

Controller 48 is operably coupled with one or more components of system 20 by data transmission media 50. Data transmission media 50 includes, but is not limited to, twisted pair wiring, coaxial cable, and fiber optic cable. Data transmission media 50 also includes, but is not limited to, wireless, radio and infrared signal transmission systems. Controller 48 is configured to provide operating signals to these components and to receive data from these components via data transmission media 50.

In general, controller 48 accepts data from cameras 26, 28, 40, projector 24 and light source 47, and is given certain instructions for the purpose of determining the 3D coordinates of points on surfaces being scanned. The controller 48 may compare the operational parameters to predetermined variances and if the predetermined variance is exceeded, generates a signal that may be used to indicate an alarm to an operator or to a remote computer via a network. Additionally, the signal may initiate other control methods that adapt the operation of the system 20 such as changing the operational state of cameras 26, 28, 40, projector 24 or light source 42 to compensate for the out of variance operating parameter.

The data received from cameras 26, 28, 40 may be displayed on a user interface 52. The user interface 52 may be an LED (light-emitting diode) display, an LCD (liquid-crystal diode) display, a CRT (cathode ray tube) display, a touch-screen display or the like. A keypad may also be coupled to the user interface for providing data input to controller 48. In an embodiment, the controller 48 displays in the user interface 52 a point cloud to visually represent the acquired 3D coordinates.

In addition to being coupled to one or more components within system 20, controller 48 may also be coupled to external computer networks such as a local area network (LAN) and the Internet. A LAN interconnects one or more remote computers, which are configured to communicate with controller 48 using a well-known computer communications protocol such as TCP/IP (Transmission Control Protocol/Internet(^) Protocol), RS-232, ModBus, and the like. Additional systems 20 may also be connected to LAN with the controllers 48 in each of these systems 20 being configured to send and receive data to and from remote computers and other systems 20. The LAN is connected to the Internet. This connection allows controller 48 to communicate with one or more remote computers connected to the Internet.

Controller 48 includes a processor 54 coupled to a random access memory (RAM) device 56, a non-volatile memory (NVM) device 58, a read-only memory (ROM) device 60, one or more input/output (I/O) controllers, and a LAN interface device 62 via a data communications bus.

Figure 8:
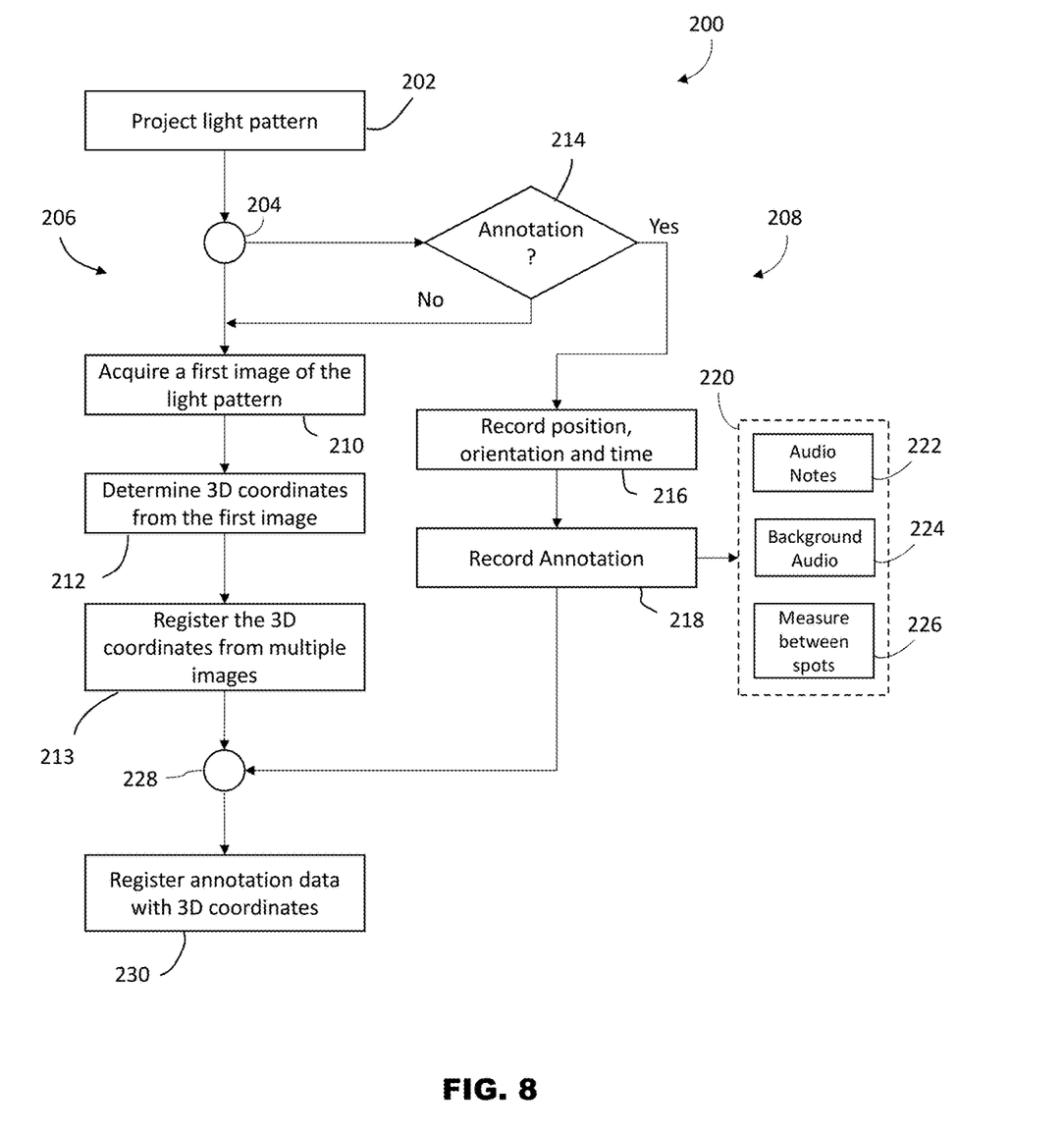
FIG. 8 is a flow diagram of a method of operating a 3D imager, in accordance with an embodiment.

LAN interface device 62 provides for communication between controller 48 and a network in a data communications protocol supported by the network. ROM device 60 stores an application code, e.g., main functionality firmware, including initializing parameters, and boot code, for processor 54. Application code also includes program instructions as shown in FIG. 8 for causing processor 54 to execute any system 20 operation control methods, including starting and stopping operation, changing operational states of projector 24 and annotation device 47, monitoring predetermined operating parameters, and generation of alarms. In an embodiment, the application code creates an onboard telemetry system may be used to transmit operating information between the system 20 and one or more remote computers or receiving locations. The information to be exchanged remote computers and the controller 48 include but are not limited to 3D coordinate data and images.

NVM device 58 is any form of non-volatile memory such as an EPROM (Erasable Programmable Read Only Memory) chip, a disk drive, or the like. Stored in NVM device 58 are various operational parameters for the application code. The various operational parameters can be input to NVM device 58 either locally, using a user interface 52 or remote computer, or remotely via the Internet using a remote computer. It will be recognized that application code can be stored in NVM device 58 rather than ROM device 60.

Controller 48 includes operation control methods embodied in application code such as that shown in FIG. 8. These methods are embodied in computer instructions written to be executed by processor 54, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, C#, Objective-C, Java, Javascript ALGOL (algorithmic language), BASIC (beginners all-purpose symbolic instruction code), visual BASIC, ActiveX, HTML (HyperText Markup Language), Python, Ruby and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

As will be discussed in more detail herein, the controller 48 may be configured to receive audio annotation data and associate/integrate the annotation data with the three-dimensional coordinate data. In an embodiment, the audio annotation data is a spoken voice. In one embodiment, the controller 48 includes computer instructions written to be executed by processor 54 to translate the audio annotation data from a first spoken language to a second spoken language.

In an embodiment, the controller 48 further includes an energy source, such as battery 64. The battery 64 may be an electrochemical device that provides electrical power for the controller 48. In an embodiment, the battery 64 may also provide electrical power to the cameras 26, 28, 40, the projector 24 and the annotation device 47. In some embodiments, the battery 64 may be separate from the controller (e.g. a battery pack). In an embodiment, a second battery (not shown) may be disposed in the housing 36 to provide electrical power to the cameras 26, 28, 40 and projector 24. In still further embodiments, the light source 42 may have a separate energy source (e.g. a battery pack).

In one embodiment, the controller 48 may include a microphone 65. As discussed further herein, the microphone 65 may be used to annotate the point cloud data acquired during the scanning process. In an embodiment, the microphone 65 may be used by itself, or in combination with an annotation device 47.

It should be appreciated that while the controller 48 is illustrated as being separate from the housing 36, this is for exemplary purposes and the claims should not be so limited. In other embodiments, the controller 48 is integrated into the housing 36. Further, while embodiments herein illustrate the controller 48 as being coupled with a single image scanner 22, this is for exemplary purposes and the claims should not be so limited. In other embodiments, the controller 48 may be coupled to and combine three-dimensional coordinate data and annotation data from multiple image scanners 22.

Figure 2:
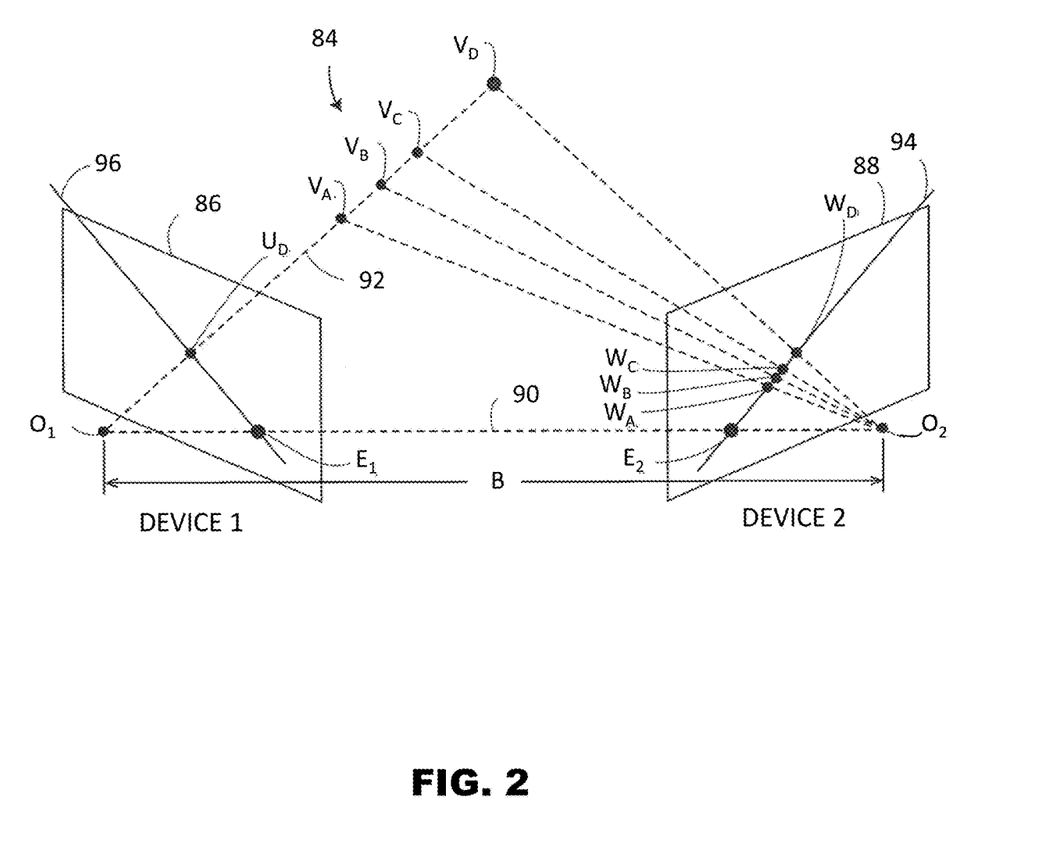
FIG. 2 and FIG. 3 are schematic illustrations of the principle of operation of the 3D imager of FIG. 1.

In the illustrated embodiment, the projector 24 and cameras 26, 28 are arranged spaced apart in a triangular arrangement where the relative distances and positions between the components is known. The triangular arrangement is advantageous in providing information beyond that available for two cameras and a projector arranged in a straight line or from a system with a projector and a single camera. The additional information may be understood in reference to FIG. 2, which explain the concept of epipolar constraints, and FIG. 3 that explains how epipolar constraints are advantageously applied to the triangular arrangement of the system 20. In FIG. 2, a 3D triangulation instrument 84 includes a device 1 and a device 2 on the left and right sides as view from the viewpoint of FIG. 2, respectively. Device 1 and device 2 may be two cameras or device 1 and device 2 may be one camera and one projector. Each of the two devices, whether a camera or a projector, has a perspective center, $O_1$ and $O_2$, and a representative plane, 86 or 88. The perspective centers are separated by a baseline distance B, which is the length of the line 90. The perspective centers $O_1$, $O_2$ are points through which rays of light may be considered to travel, either to or from a point on a surface in the area of the environment being scanned. These rays of light either emerge from an illuminated projector pattern or impinge on a photosensitive array. The placement of the reference planes 86, 88 is applied in FIG. 2, which shows the reference planes 86, 88 between the object point and the perspective centers $O_1$, $O_2$.

In FIG. 2, for the reference plane 86 angled toward the perspective center $O_2$ and the reference plane 88 angled toward the perspective center $O_1$, a line 90 drawn between the perspective centers $O_1$ and $O_2$ crosses the planes 86 and 88 at the epipole points $E_1$, $E_2$, respectively. Consider a point $U_D$ on the plane 86. If device 1 is a camera, it is known that an object point that produces the point $U_D$ on the image lies on the line 92. The object point might be, for example, one of the points $V_A$, $V_B$, $V_C$, or $V_D$. These four object points correspond to the points $W_A$, $W_B$, $W_C$, $W_D$, respectively, on the reference plane 88 of device 2. This is true whether device 2 is a camera or a projector. It is also true that the four points lie on a straight line 94 in the plane 88. This line, which is the line of intersection of the reference plane 88 with the plane of $O_1$-$O_2$-$U_D$, is referred to as the epipolar line 94. It follows that any epipolar line on the reference plane 88 passes through the epipole $E_2$. Just as there is an epipolar line on the reference plane of device 2 for any point on the reference plane of device 1, there is also an epipolar line 96 on the reference plane of device 1 for any point on the reference plane of device 2.

Figure 3:
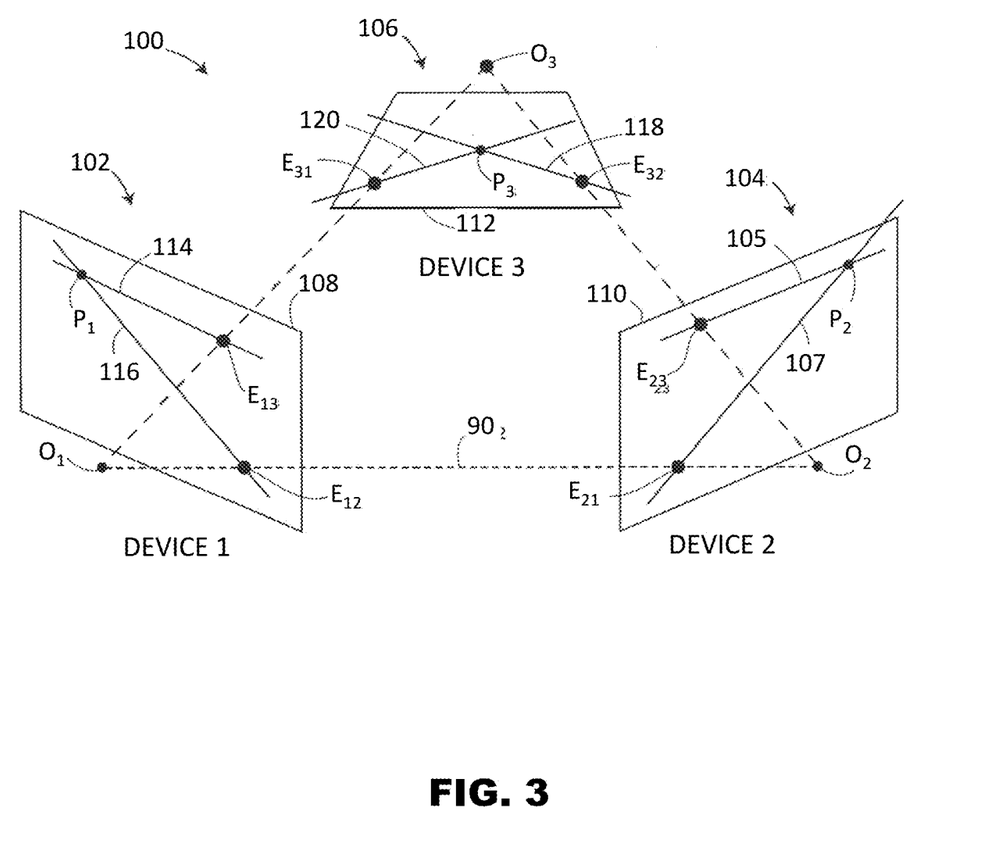

FIG. 3 illustrates the epipolar relationships for a 3D imager 100 corresponding to triangulation instrument 84 of FIG. 2 in which two cameras and one projector are arranged in a triangular pattern. In general, the device 1, device 2, and device 3 may be any combination of cameras and projectors as long as at least one of the devices is a camera. Each of the three devices 102, 104, 106 has a perspective center $O_1$, $O_2$, $O_3$, respectively, and a reference plane 108, 110, and 112, respectively. Each pair of devices has a pair of epipoles. Device 1 and device 2 have epipoles $E_{12}$, $E_{21}$ on the planes 108, 110, respectively. Device 1 and device 3 have epipoles $E_{13}$, $E_{31}$, respectively on the planes 108, 112, respectively. Device 2 and device 3 have epipoles $E_{23}$, $E_{32}$ on the planes 110, 112, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

Consider the embodiment of FIG. 3 in which device 3 is a projector, device 1 is a first camera, and device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 108 to obtain the epipolar line 114. Intersect the plane $P_2$-$E_{21}$-$E_{12}$ to obtain the epipolar line 116. If the image point $P_1$ has been determined consistently, the observed image point $P_1$ will lie on the intersection of the determined epipolar line 114 and line 116.

To check the consistency of the image point $P_2$, intersect the plane $P_3$-$E_{32}$-$E_{23}$ with the reference plane 110 to obtain the epipolar line 105. Intersect the plane $P_1$-$E_{12}$-$E_{21}$ to obtain the epipolar line 107. If the image point $P_2$ has been determined consistently, the observed image point $P_2$ will lie on the intersection of the determined epipolar lines 107 and 105.

To check the consistency of the projection point $P_3$, intersect the plane $P_2$-$E_{23}$-$E_{32}$ with the reference plane 110 to obtain the epipolar line 118. Intersect the plane $P_1$-$E_{13}$-$E_{31}$ to obtain the epipolar line 120. If the projection point $P_3$ has been determined consistently, the projection point $P_3$ will lie on the intersection of the determined epipolar line 118 and line 120.

The redundancy of information provided by using a 3D imager 100 having a triangular arrangement of projector and cameras may be used to reduce measurement time, to identify errors, and to automatically update compensation/calibration parameters. It should be appreciated that based on the epipolar geometry relationships described herein, the distance from the image scanner 22 to points on the surface being scanned may be determined. By moving the image scanner 22, the determination of the pose/orientation of the image scanner, and a registration process the three dimensional coordinates of locations (point data) on a surface may be determined.

Figure 4:
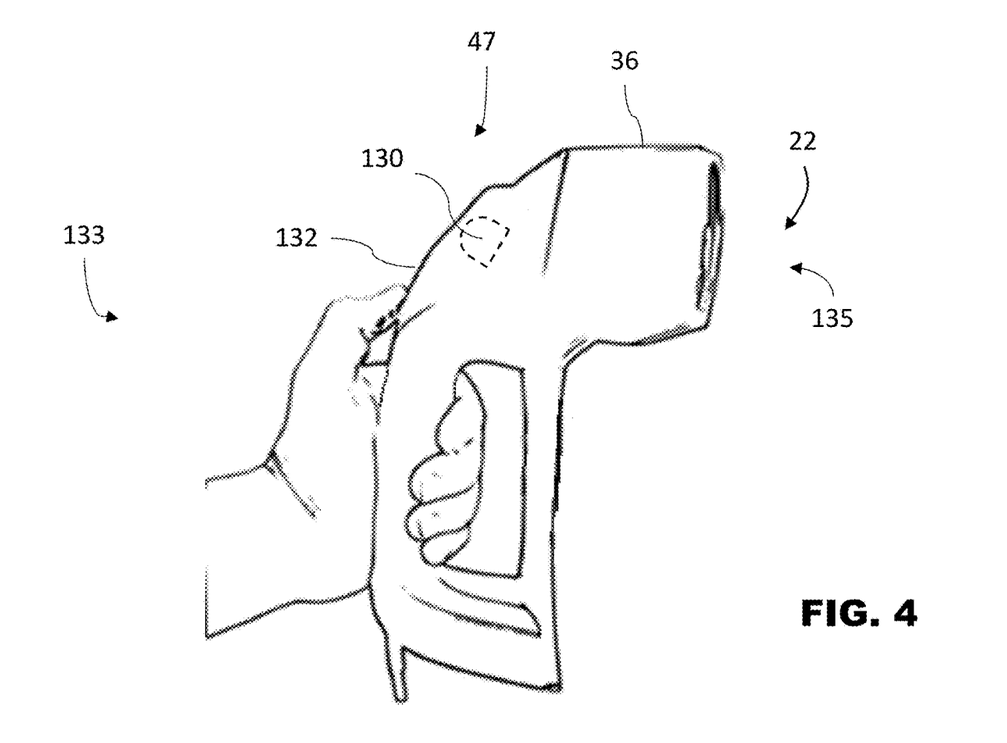
FIG. 4 is a side view of a 3D imager system in accordance with an embodiment of the invention.

Referring now to FIG. 4, an embodiment of the image scanner 22 is shown having an annotation device 47, such as a microphone 130 coupled to the housing 36. The microphone 130 is coupled to the controller 48 to transmit a signal in response to an external sound. In an embodiment, the microphone 130 transmits a signal to the controller 48 in response to a user input, such as by depressing an actuator for example. In the embodiment of FIG. 4, the microphone 130 is positioned on or adjacent a handle 132 on a rear side 133 of the image scanner 22 to record sounds, such as the user's voice. As used herein, the rear side 133 is opposite the front side 135, the front side being the side from which the projector 24 emits a light pattern. As will be discussed in more detail herein, the microphone 130 allows the user to annotate the scanned data with additional information, such as notes on what the user is observing during the scan for example.

Figure 5:
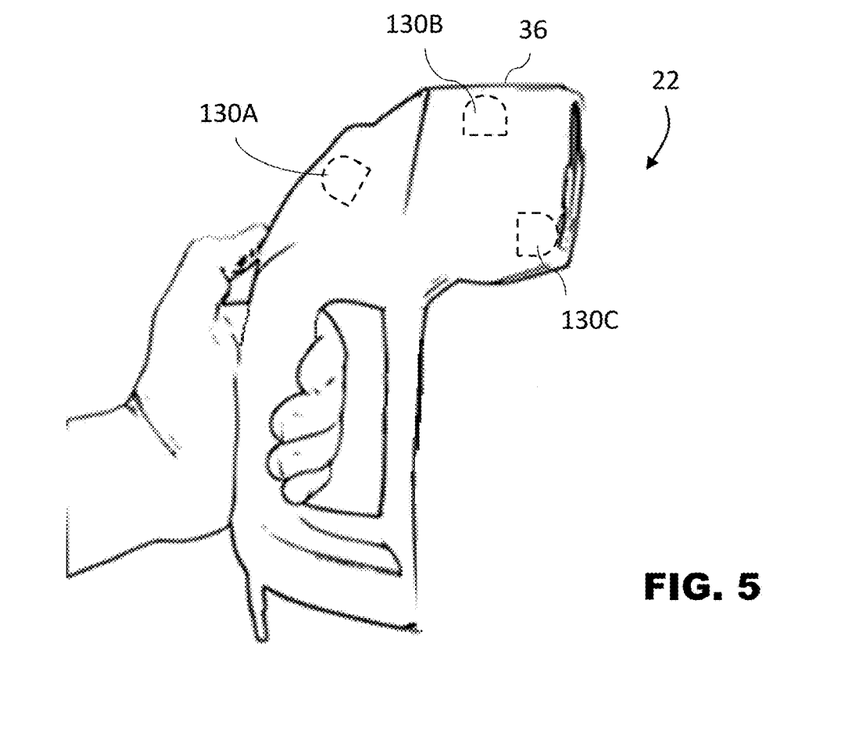
FIG. 5 is a side view of a 3D imager system in accordance with another embodiment of the invention.

In the embodiment of FIG. 5, the annotation device 47 includes a plurality of microphones 130A, 130B, 130C. The microphones 130A, 130B, 130C, are each arranged to record sound from a different direction. This provides advantages in allowing background noise to be recorded during the scan. Further, since multiple microphones 130A, 130B, 130C are recording a sound the direction of the source of the sound may be identified. When this is combined with the location of the image scanner 22 (as determined from the 3D coordinates acquired during the scan) and the orientation/pose of the image scanner 22, the direction (and potential locations) of the source of the sound may be annotated or merged with the 3D coordinate data.

It should be appreciated that the ability to record sound, such as verbal notes spoken by the user provides advantages in that it allows the user to integrate the annotations with the 3D coordinate data, whereas previously these notes would have been kept separately. Further, the separate, and usually handwritten, notes would not have the positional association within the 3D coordinate data that embodiments described herein provide.

In still further embodiments, the microphones 130 may be used to control the image scanner 22 with audio commands. In this embodiment, in response to an operator input, the microphone 130 receives spoken/audible words from the operator. The controller 48 matches the received words with a list of predetermined commands and initiate control sequences or procedures in response.

Figure 6:
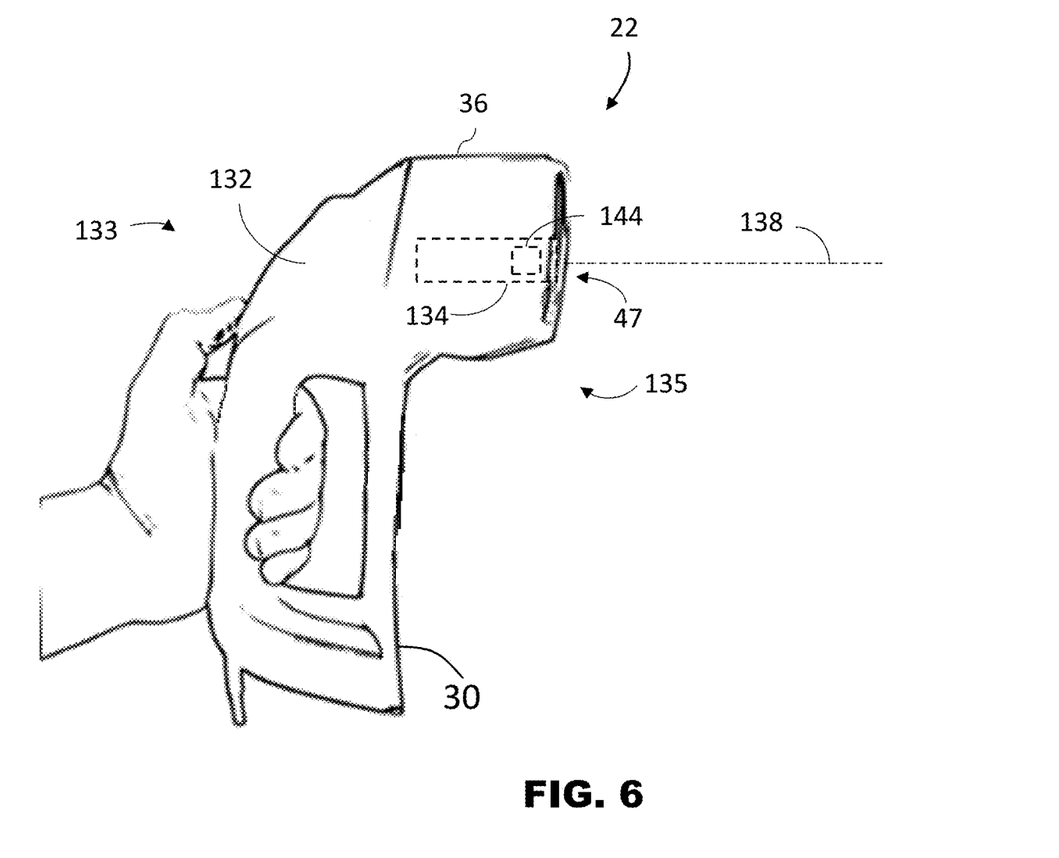
FIG. 6 is a side view of a 3D imager system in accordance with another embodiment of the invention.

Referring now to FIG. 6, an embodiment is shown of an image scanner 22 having an annotation device 47 that includes a laser light source 134. In an embodiment, the laser light source 134 is arranged to emit a visible beam of light 138 from the front 135 of the image scanner 22, such as from an area adjacent the color camera 40 for example. In an embodiment, the laser light source 134 emits a light beam having a predetermined wavelength in the visible spectrum. In an embodiment, the predetermined wavelength is between 400-700 nanometers, in another embodiment, the predetermined wavelength is about 650 nanometers.

Figure 7:
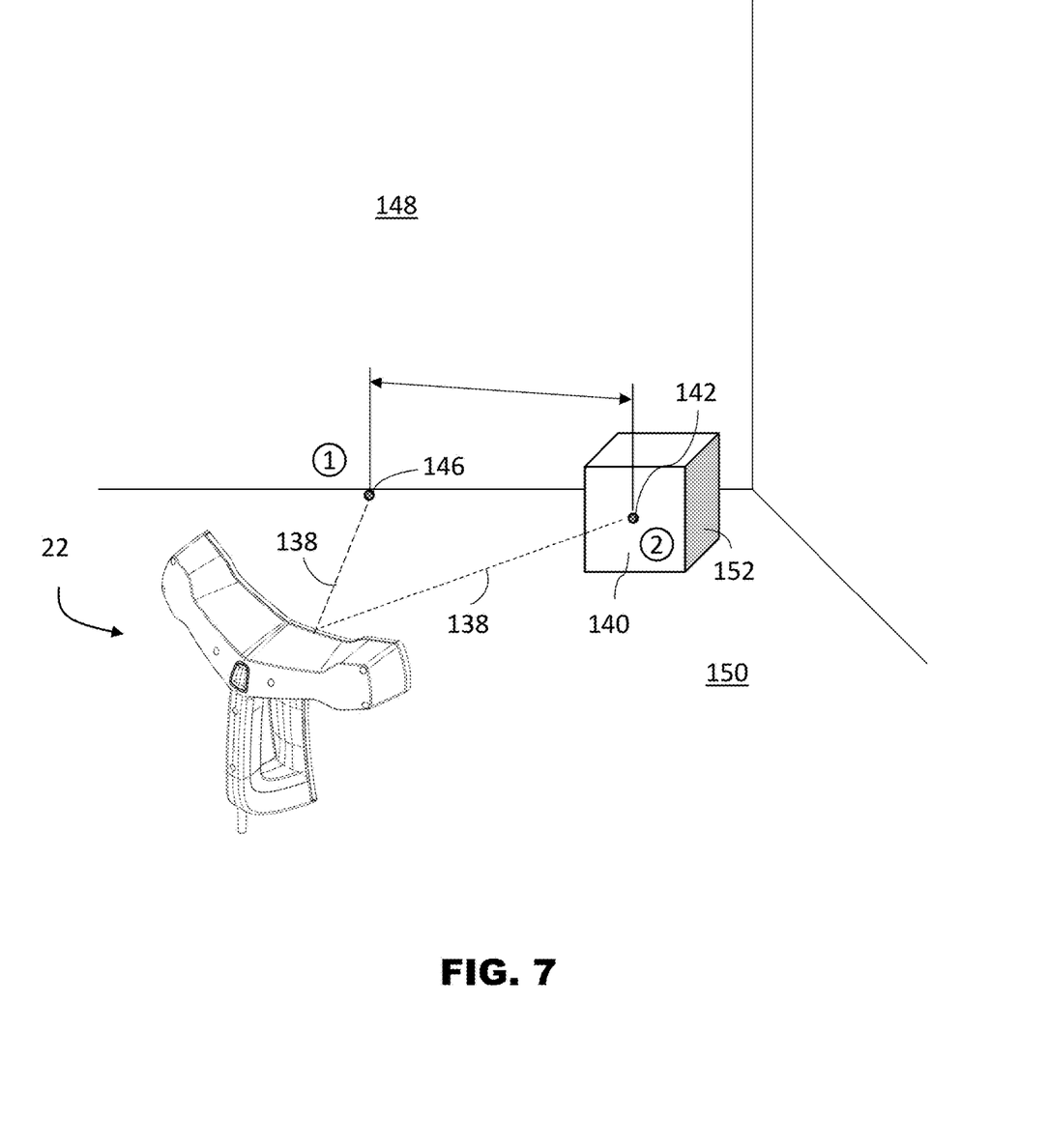
FIG. 7 is an illustration of a 3D imager measuring a distance between user defined points in an environment in accordance with an embodiment.

It should be appreciated when the visible beam of light 138 intersects or strikes a surface, such as surface 140 shown in FIG. 7 for example, a visible mark or spot of light 142 will appear on the surface. Since the spot of light 142 is within the field of view of the color camera 40, the spot of light 142 will appear on images acquired by the color camera 40 and as a result may be incorporated into the 3D point cloud generated by the image scanner 22. This enables the operator to mark a point or location in the environment and later have this location incorporated into the 3D data. Further, in an embodiment, the annotation device 47 includes both the laser light source 134 and the microphones 130, which allows an operator to mark a spot of light 142 on an environment and also contemporaneously record audio notes or comments.

In one embodiment, the operator may use the spot of light 142 to indicate cardinal points that will be used by the controller for registration of the images acquired by the image scanner 22 during the scanning process. In still another embodiment, the controller 48 receives a computer-aided-design (CAD) model of an object being scanned and the spot of light 142 marked by the operator defines a reference point for the CAD model.

In an embodiment, the laser light source 134 includes a steering mechanism 144. The steering mechanism 144 may be a galvomirror or a digital micromirror device for example. The steering mechanism 144 allows the direction that the light beam 138 to be changed relative to the front side 135. In an embodiment, the direction of the light beam 138 may be dynamically changed as the image scanner 22 is moved or its pose changed. In another embodiment, the direction of the light beam 138 may be changed by the operator, such as through the controller 48 for example.

In one embodiment, the operator may direct the light beam 138 to create a spot of light 142 in a desired position. The operator, such as via controller 48 for example, may lock the light beam 138 on that spot. Then as the position or pose of the image scanner 22 changes, the steering mechanism 144 automatically changes the direction of the light beam 138 to maintain the spot of light 142 in the locked on location. It should be appreciated that the spot of light 142 will then appear in multiple images acquired by color camera 140.

Referring now to FIG. 7, another embodiment is shown of the image scanner 22 having the laser light source 134. In this embodiment, the operator may direct the light beam 138 to mark a spot of light 146 at a first location, such as at the corner of a wall 148 and a floor 150 for example. The operator then redirects the light beam 138 to generate a spot of light 142 at a second location, such as on an object 152 for example. As described herein, the image scanner 22 is able to determine the three-dimensional coordinates of each location of the spots of light 146, 142, the system 20 is able to directly measure the distance between the two user-defined locations.

In one embodiment, the operator may move or change the pose of the image scanner 22 between marking the first location with the spot of light 146 and the second location with a spot of light 142. In another embodiment, the laser light source 134 includes the steering mechanism 144 and the operator may use the steering mechanism to change the direction of the light beam 138. It should be appreciated that the locations of spots of light 146, 142 do not need to be within the same field of view of the cameras 26, 28, 40 for the distance between the locations of the spots of light 146, 142 to be measured.

In still another embodiment, the image scanner 22 may determine the three-dimensional coordinates of the locations of the spots of light 146, 142 directly using the laser light source 134 and the color camera 40. It should be appreciated that the laser light source and color camera 40 may be device 1 and device 2 of FIG. 2, therefore, as described herein the distance from the image scanner 22 to the locations of the spotes of light 146, 142 may be determined without scanning using the projector 24 and cameras 26, 28.

Referring now to FIG. 8, an exemplary method 200 is shown of operating the system 20 to annotate 3D coordinate data with annotation data. The method 200 starts in block 202 where the light pattern is projected by the projector 24 onto a surface of an object being scanned to obtain its 3D coordinates. The method 200 then proceeds to node 204. In an embodiment, the system 20 is configured to perform multiple processes simultaneously, such as the scanning of the object and the recording of annotation data. In an embodiment, at node 204, the method 200 bifurcates into a first process 206 that measures the three-dimensional coordinates of the object being scanned and a second process 208 that acquires annotation data.

The first process 206 includes the acquiring of an images (or multiple images) of the light pattern projected by projector 24 with cameras 26, 28 in block 210. The system 20 then proceeds to block 212 where the three-dimensional coordinates of the scanned area are determined. In some embodiments, the acquisition of three-dimensional coordinates of an object may involve scanning the object from multiple locations where the image scanner 22 is moved relative to the object (or the object is moved relative to the image scanner). In these embodiments, the first process proceeds to block 213 where the three-dimensional coordinate data from the multiple scanning positions is registered. It should be appreciated that the registration of the three-dimensional coordinate data may be performed during the scanning process (simultaneously with or contemporaneously with the determination of the three-dimensional coordinates) or may be performed after the object is scanned.

The second process 208 initiates at query block 214 where it is determined whether the operator desires to record any annotations. In an embodiment, the image scanner 22 may have an actuator or switch (not shown) on the handle 132 that the operator actuates to initiate the annotations. When the query block 214 returns a positive, the second process 208 proceeds to block 216 where at least one of a position, orientation/pose or time is recorded. It should be appreciated that this may be used to register the annotation data to the three-dimensional coordinate data.

The second process 208 then proceeds to block 218 where the annotation data 220 is recorded. The annotation data may include, but is not limited to, audio notes 222, background audio 224, and measurements between user defined locations 226 for example. The second process 208 then proceeds to node 228 and merges with the first process 206. The method 200 then proceeds to block 230 where the annotation data 220 is registered with the three-dimensional coordinate data.

It should be appreciated that the first process 206 and the second process 208 may be performed multiple times during the scanning process and the single instance illustrated in FIG. 8 is intended to be exemplary and the claims should not be so limited. Further, the registration of the annotation data with the three-dimensional data may be performed simultaneously with or contemporaneously with the determination of the three-dimensional coordinates.

Further, it should be appreciated that while embodiments herein describe the annotation data with respect to recording sound or marking locations with light, this is for exemplary purposes and the claims should not be so limited. In other embodiments, other types or sources of data may be integrated with the three-dimensional coordinate data to annotate the point cloud. Other annotation data may include data received via LAN/internet interface device 62, such as but not limited to measurement data, documentation data, hyperlinks, and web addresses for example.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A three-dimensional (3D) measurement system comprising:
   a noncontact measurement device operable to measure a distance from the noncontact measurement device to a surface;
   an annotation member coupled to the noncontact measurement device;

a laser light source arranged to emit a visible light beam from the noncontact measurement device; and
a processor operably coupled to the noncontact measurement device and the annotation member, the processor operable to execute computer instructions when executed on the processor for determining 3D coordinates of a first point in a field of view based at least in part on the distance, recording an annotation received from a user, and associating the annotation with the first point;
wherein the processor is further operable to execute the computer instructions to perform a method comprising:
highlighting, by the 3D measurement system the first point on the surface by emitting, by the laser light source, from a first position of the 3D measurement system, the visible light beam onto said first point;
locking, by the laser light source, the first point on the surface, in response to an input from the user; and
in response to the 3D measurement system moving to a second position, maintaining the highlight of the first point on the surface by emitting the visible light beam onto the first point from the second position of the 3D measurement system.

2. The system of claim 1, wherein the annotation member is a microphone arranged to receive sounds from the user.

3. The system of claim 2, wherein the microphone includes a plurality of microphones, each of the plurality of microphones being coupled to the noncontact measurement device and arranged to receive sound from a different direction.

4. The system of claim 3, wherein the processor is further operable to determine a direction that the sound is generated based on signals from the plurality of microphones.

5. The system of claim 2, wherein the processor is further operable to execute a process on the noncontact measurement device in response to a sound received by the microphone from the user.

6. The system of claim 1, wherein the processor is further operable to perform a method comprising:
in a first instance emitting the visible light beam onto the first point in response to a first input from the user;
in a second instance emitting the visible light beam onto a second point in response to a second input from the user; and
comparing measurement data around the first point and the second point based at least in part on the 3D coordinates of the first point and the second point.

7. The system of claim 1, wherein the noncontact measurement device includes a camera with the field of view, and wherein the processor is further operable to perform a method comprising:
emitting the visible light beam onto a surface in response to an input from the user;
acquiring an image of the surface with a spot of light from the visible light beam; and
determining 3D coordinates of the spot of light on the surface based at least in part on a baseline distance between the camera and the laser light source.

8. The system of claim 1, wherein the annotation member further includes a microphone, and wherein the processor is further operable to perform a method comprising:
emitting the visible light beam onto a surface in response to the input from the user;
acquiring an image of the surface with a spot of light from the visible light beam;
recording a sound from the user; and
associating the recording of the sound with the image.

9. The system of claim 1, wherein the noncontact measurement device includes a camera with the field of view, and wherein the processor is further operable to perform a method comprising:
emitting the visible light beam onto a surface in response to the input from the user;
acquiring an image of the surface with a spot of light from the visible light beam; and
receiving a computer-aided design (CAD) model of an object being scanned; and
defining a reference point on the CAD model based at least in part on the image.

10. The system of claim 1, wherein the noncontact measurement device includes a camera with the field of view, and wherein the processor is further operable to perform a method comprising:
defining a reference point in a computer-aided-design model; and
emitting the visible light beam onto a feature of an object in response to the input from the user, the feature being based at least in part on the reference point.

11. A method comprising:
acquiring point data about a plurality of points on a surface with a noncontact measurement device;
determining 3D coordinates of the plurality of points based at least in part on the point data;
in a first instance, recording annotation data with an annotation member in response to an input from a user, the annotation member being coupled to the noncontact measurement device;
associating, interactively, the annotation data with at least a portion of the 3D coordinates of points, wherein the portion of the 3D coordinates of points were determined from the point data acquired contemporaneously with the annotation data, wherein the associating comprises:
highlighting the portion of the 3D coordinates by emitting, by a laser light source, from a first position of the noncontact measurement device, a visible light beam onto a first point from the portion of the 3D coordinates;
locking the first point, in response to the input from the user; and
in response to the noncontact measurement device moving to a second position, maintaining the highlight of the first point by emitting the visible light beam onto said first point from the second position of the noncontact measurement device.

12. The method of claim 11, wherein the annotation member includes a microphone and the recording of annotation data includes recording sound data.

13. The method of claim 12, wherein the sound data includes an operator's voice.

14. The method of claim 12, wherein the annotation member includes a plurality of microphones, each of the microphones arranged to receive sound from a different direction.

15. The method of claim 14, further comprising determining a direction of the sound based at least in part on signals from each of the plurality of microphones.

16. The method of claim 12, further comprising executing a process on the noncontact measurement device based at least in part on the sound data.

17. The method of claim 11, wherein the annotation member includes the laser light source that emits the visible light beam and recording annotation data further comprising:

emitting the visible light beam onto a surface in an environment;

acquiring an image of a spot of light on the surface generated by the visible light beam.

18. The method of claim 17, wherein the recording the annotation data further comprises:

in a first instance emitting the visible light beam onto the first point in response to a first input from the user;

in a second instance emitting the visible light beam onto a second point in response to a second input from the user; and comparing measurement data around the first point and the second point based at least in part on the 3D coordinates of the first point and the second point.

19. The method of claim 17, wherein the recording annotation data further comprises determining 3D coordinates of the spot of light on the surface based at least in part on a baseline distance between a camera and the laser light source.

20. The method of claim 17, wherein the recording annotation data further comprises:

recording a sound from the user; and associating the recording of the sound with the image.

21. The method of claim 17, wherein the recording annotation data further comprises:

defining a reference point in a computer-aided-design model;

receiving by the noncontact measurement device the computer-aided design (CAD) model of an object being scanned; and emitting the visible light beam onto a feature of the object in response to the input from the user, the feature being based at least in part on the reference point.

22. The method of claim 17, wherein:

the emitting of the visible light beam includes emitting the visible light beam onto a feature of the surface; and acquiring a feature image of the feature with the spot of light from the visible light beam.

* * * * *